March 28, 1961 V. A. KALISH 2,976,866
VIBRATOR

Filed Feb. 11, 1959 2 Sheets-Sheet 1

INVENTOR.
VICTOR A. KALISH
BY Cullen & Cantor
ATTORNEYS

March 28, 1961 V. A. KALISH 2,976,866
VIBRATOR
Filed Feb. 11, 1959 2 Sheets-Sheet 2

INVENTOR.
VICTOR A. KALISH
BY Cullen & Cantor
ATTORNEYS

United States Patent Office 2,976,866
Patented Mar. 28, 1961

2,976,866

VIBRATOR

Victor A. Kalish, 12927 Hamilton Ave., Highland Park, 3, Mich., assignor of fifty percent to Max Harley, Detroit, Mich.

Filed Feb. 11, 1959, Ser. No. 792,489

2 Claims. (Cl. 128—33)

This invention relates to a vibrator and more particularly to a device adapted to be applied to various parts of the human body to impart a vibration thereto.

As is well known, one helpful therapy for various muscular and nervous tension problems of the human body is the application of a vibration to various parts of the human body for relief of such problems. Thus, there are various types of vibrators available which may be applied to parts of the human body for the purpose of relieving stiff muscles and muscular tension, relieving nervous tension, relieving poor circulation, relieving various muscular aches and pains, and in aiding in reducing of weight.

The prior devices available on the market for applying a vibration to the human body are for the most part large and cumbersome and extremely expensive in construction.

Thus, it is an object of this invention to form a suitable vibrator for applying vibrations to various parts of the human body, but which vibrator is inexpensively and simply constructed, extremely rigid and durable, and is provided with a degree of adjustability for meeting the contours of the human body.

A further object of this invention is to form a vibration means for the vibrator which is inexpensive, simple in construction, and wherein the amplitude of the vibration may be varied by varying the speed of a small electrical motor.

Yet a further object of this invention is to provide a vibrator formed of several relatively movable parts which parts are normally connected together rigidly so that a vibration means arranged in one of the parts transmits vibration to the other parts and the parts are not disturbed from their adjusted positions, but wherein the parts may be adjustable when desired.

These and other objects and advantages of this invention will become apparent upon reading the following description of which the attached drawings form a part.

With reference to the attached drawings, in which.

Figure 1:
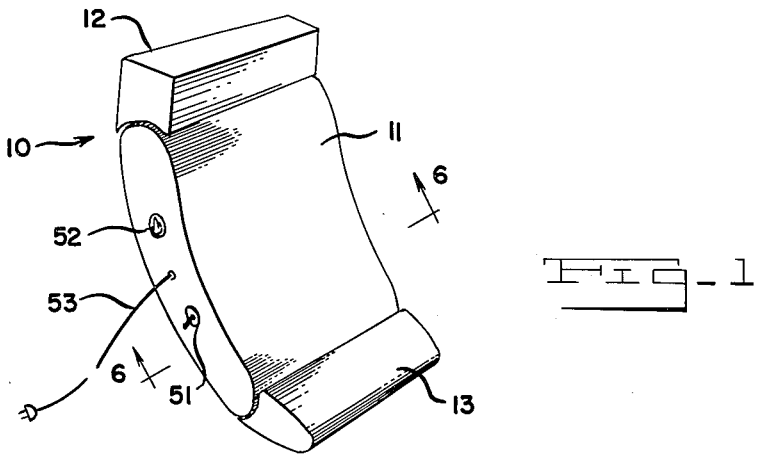
Fig. 1 is a perspective view of the complete vibrator.

With reference to Fig. 1, the vibrator herein, generally designated as 10, is formed of three relatively adjustable parts, namely, body portion 11, upper or head extension 12, and lower or foot extension 13.

Figure 2:
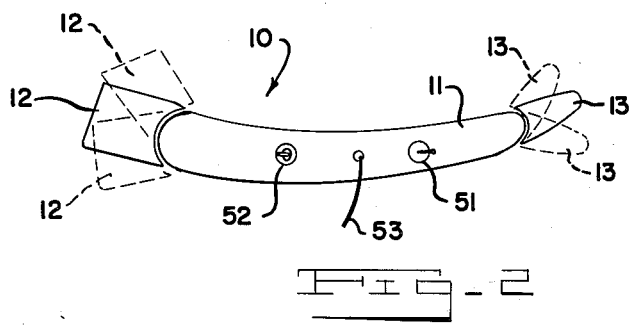
Fig. 2 is a side view of the vibrator and shows the parts in various adjusted positions in dotted line positions.
Figure 3:
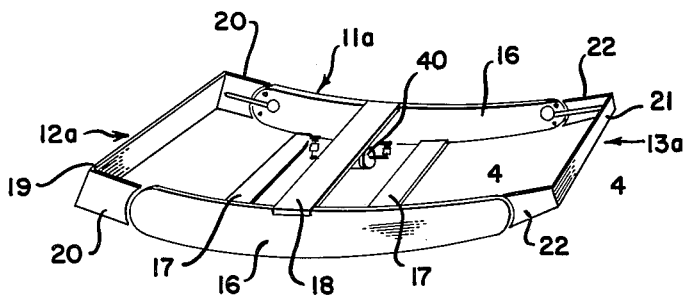
Fig. 3 is a view of the frame of the vibrator.

The body portion is formed with a curved surface, as seen in Fig. 1 and Fig. 2, for better fitting around the contours of the human body. The head extension is formed as a pillow like part and the foot extension 13 is tapered somewhat so as to fit beneath the human body and permit partial seating thereon.

The entire vibrator is relatively small. For example, the body portion may be in the area of two feet in length and one and one-half feet in width and about five or six inches in depth, with the head portion being about 8 inches in length and the foot portion also being about 8 inches in length. Obviously, the dimensions may be varied considerably, but are given herein merely to illustrate the relative sizes of the various parts and to illustrate the relative compactness of the overall construction.

The body portion 11 is formed of a frame 11a consisting of side rails 16, bottom crossbars 17 and top crossbar 18. The frame may be formed of wood or the like and the rails and crossbars are rigidly connected together so that the entire frame is strong, rigid, and non-flexible.

The head extension is also formed of a frame 12a having a cross-piece 19 and side rails 20. The foot extension is formed of a frame 13a having a cross-member 21 and side rail 22.

Figure 4:
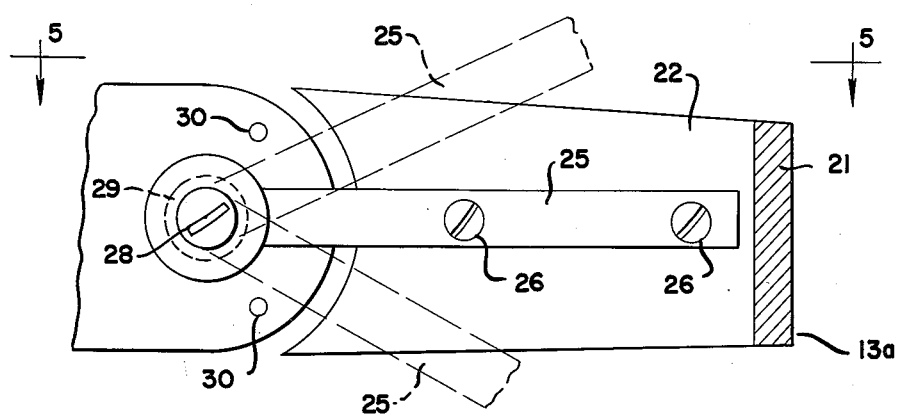
Fig. 4 is an enlarged, cross-section, fragmentary view taken in the direction of arrows 4—4 of Fig. 3.
Figure 5:
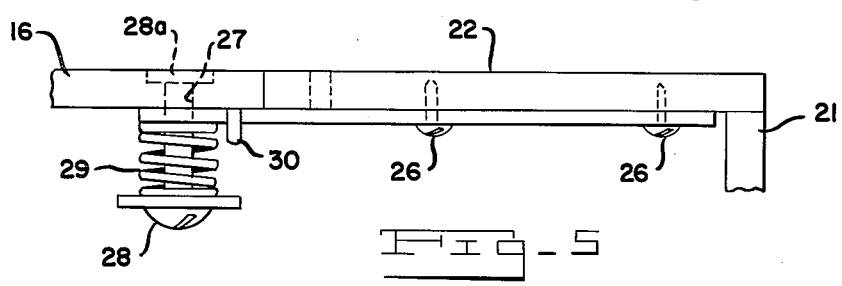
Fig. 5 is a view taken in the direction of arrows 5—5 of Fig. 4.

The frames of the extensions are pivotally connected to the frame of the body portion. As illustrated in Figs. 4 and 5, this connection is formed through a rigid strap 25, which may be formed of a rigid strip of metal and which is securely fastened to the side rails of the foot extension and head extension, as shown in Fig. 4, by means of screws 26 or the like. The opposite end of each strap 25 is provided with an opening 27 through which a stud 28 is passed. The stud may be in the form of a bolt and nut 28a and extends a considerable distance beyond the face of the strap. A heavy duty coil spring 29 is interposed between the head of the stud and the strap so as to apply pressure against the strap and prevent ordinary movement of the strap and rigidly hold the strap against the side rail 16.

The strap 25 with its attached extension may be pivoted as shown by the dotted line positions in Fig. 4 but the degree of pivoting is limited by pins 30.

Ordinarily, the extensions are placed in some position relative to the body portion and are immovable relative thereto and rigid therewith. However, when an adjustment is to be made, the application of manual force against the extension will pivot the extension to a new position where it will remain under the pressure of the coil spring 29. Because of the rigidity of the joint, all vibrations from the body portion are transmitted uninterrupted to the extensions.

Figure 6:
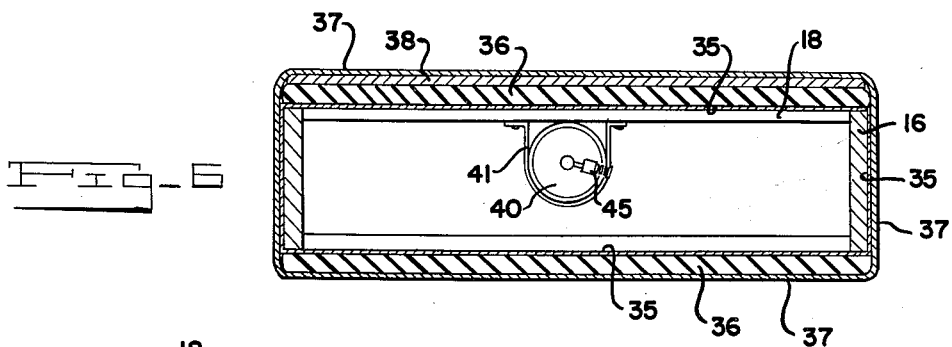
Fig. 6 is an enlarged, cross-sectional view taken in the direction of arrows 6—6 of Fig. 1.
Figure 7:
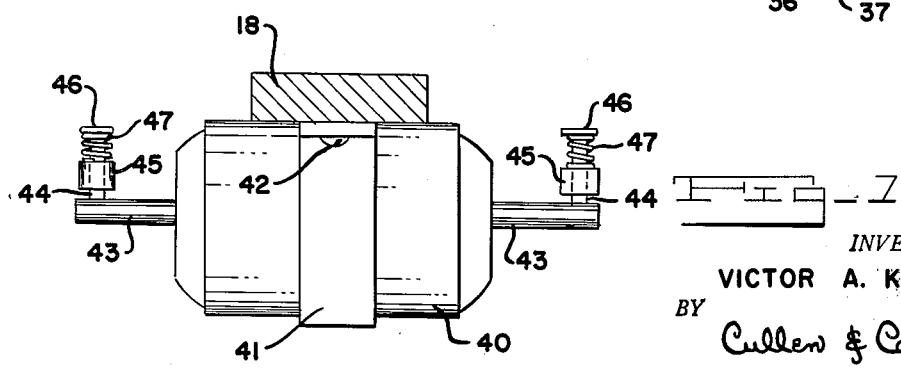
Fig. 7 is an enlarged view of a fragment showing the motor and weight construction.

As shown in Fig. 6, the framework is first covered with an aluminum or the like metallic sheet 35, which sheet may be of the thickness of a heavy piece of paper of thin cardboard, such as $\frac{1}{64}$ of an inch in thickness. It is rigidly secured to the framework by tacks or the like so as to protect and to rigidify the frame.

The aluminum in turn is covered, at least on the upper and lower faces of the body portion and the extensions, with a padding 36 which may be in the form of a foam rubber padding or the like.

The body portion and extensions are then covered with an outer covering 37 which may be of a suitable cloth or plastic sheet which is flexible and sturdy enough to take the wear and abuse of the vibrator. Many types of cloth and plastic sheets are readily available and further description thereof is deemed unnecessary.

On the inside curve of the body portion surface, located between the padding 36 and the outer cover 37, is a heating pad 38. This heating pad may be in the usual form of cloth within which electrical heating wires are disposed so that upon the application of electrical current, the wires heat and cause the pad to become warm.

The means for vibrating the vibrator consists of a small, variable speed, fractional horsepower electrical motor 40, as 1/100 horsepower or the like, having a double ended shaft 43 extending therefrom. The shaft 43 is rotated by the motor. The motor is secured to the top cross-bar 18 by means of a clamp 41 which is nailed or secured by other mechanical fastening means 42 to the cross-bar 18.

Each end of the shaft 43 is provided with a stud 44 extending radially therefrom and rigidly fixed thereto. On the studs are weights 45, which may be in the form of cylinders having central openings of a sufficient size so that the weight may readily slide along the length of the studs 44. The weights are restrained from moving along the studs by means of coil springs 47 held by a head 46 on the stud 44.

In operation, the shaft 43 is rotated rapidly by the motor and the weights throw the shaft off balance so as to cause a vibration. The vibration is of a sixty-cycle type since the motor would normally be operated on sixty-cycle current.

The amplitude of the vibration can be varied by the position of the weights 44 along the length of their respective studs, that is, the distance of the weights away from the shaft 43. This distance will vary depending upon the speed of the motor. Thus, the faster the motor is operated and the faster the shaft 43 is turned, the further out along the studs, away from the shaft, will the weight 44 slide against the reaction of their springs 47. This is, of course, caused by centrifugal force which varies with the speed of rotation. Hence, the amplitude of vibration can be varied simply by varying the speed of the motor.

As shown in Figs. 1 and 2, an on-off switch 51 is provided to operate the heating pad 38 (the electrical circuitry is not shown since it is conventional) and a variable switch 52 is provided to vary the current to the motor 40. The switch may be of a variable potentiometer type, and simply by adjusting the switch, the speed of the motor is correspondingly adjusted. Also shown, is the electrical outlet cord and plug 53 for attachment to house current outlets.

The operation of this vibrator is as follows: The ordinary user plugs in the electrical cord 53 and then turns the vibrator control switch 52 to the desired speed of the motor which gives the desired vibration. Also, the user may or may not as he chooses, turn on the switch 51 to operate the heating pad simultaneously.

The extensions are then adjusted manually to fit the contour of the body and remain in their adjusted positions. Thereafter, the user applies the device to his body to receive the vibrations and the heat where applied. The device may be applied to the back of a person by simply having the person lean against the vibrator which in turn is leaned against the back of a chair or he may sit upon the vibrator or lean his head against the upper extension 12 or may apply the vibrator to any other part of the body as he sees fit.

This invention may be further developed within the scope of the following attached claims. Accordingly, it is desired that the foregoing description be read as being merely illustrative of an operative embodiment of this invention and not in a strictly limiting sense.

I now claim.

1. A vibrator comprising a rectangular shaped central body portion and a pair of end extensions connected to opposite ends of the body portion and being of the same width, but of considerably smaller length than the body portion; said body portion being formed of a frame including a pair of identical, thin, flat, narrow, elongated side rails arranged with their flat faces parallel to each other and being spaced apart from one another, and their corresponding side edges being coplanar; the corresponding side edges of each of the two rails being interconnected by cross-members located well between the ends of the rails to thus form a space bounded by the side rails and between the cross-members, and a vibrator motor means secured to one of the cross-members and arranged completely within said space and being arranged for vibrating the frame at predetermined uniform vibrations; said extensions each being formed of U-shaped frames consisting of two side rails each having an end rigidly connected to the other by a base member and with their free ends being arranged closely adjacent to and in end to end relationship with a corresponding pair of ends of the body frame rails, and with each pair of adjacent body frames and end extension rail ends being interconnected by a rigid, flat, metal strip rigidly fastened to and arranged in face to face relationship with one of the pair of adjacent rails and pivotally connected to the other of the two adjacent rails by means of a headed stud having a shank which passes through an opening formed in the strip and is rigidly connected to said other rail and a coil spring surrounding the shank and engaging the head and spring pressing the strip into tight face to face contact with said other rail, whereby the end extension frames may be pivoted relative to the body frame only with the application of a substantial amount of force and whereby the vibrations on the body frame are transmitted to the end extension frames through said strips, and each of the frames being covered by a separate padding.

2. A vibrator comprising a rectangular shaped central body portion and a pair of end extensions connected to opposite ends of the body portion and being of the same width of the body portion; said body portion being formed of a frame including a pair of identical elongated side members arranged parallel to but spaced apart from one another with their corresponding edges being coplanar, and being interconnected by cross-members located between their respective ends, a vibrator motor means secured to one of the cross members and arranged completely within the frame and arranged to vibrate the frame at predetermined uniform vibrations; said extensions each being formed of U-shaped frames, each having a pair of legs having corresponding ends connected together by a base member and free ends arranged closely adjacent to and in end to end alignment with a pair of corresponding ends of the frame side rails, and each adjacent leg and side rail being pivotally interconnected by a rigid, metal strip rigidly secured to one and pivotally connected to the other, and spring means pressing against the strip at its pivotal connection for frictionally holding the strip against pivoting so that the end extensions may be pivoted relative to the body portion only upon the application of considerable force and the vibrations on the body frame are transmitted through the strips to the extension frames, and each of the frames being covered by a padding.

References Cited in the file of this patent

UNITED STATES PATENTS

| | | |
|---|---|---|
| 2,574,945 | Werner | Nov. 13, 1951 |
| 2,683,453 | Tong | July 13, 1954 |
| 2,687,718 | Britton et al. | Aug. 31, 1954 |
| 2,792,830 | Dacey | May 21, 1957 |